US012355129B2

(12) United States Patent
Wang et al.

(10) Patent No.: US 12,355,129 B2
(45) Date of Patent: Jul. 8, 2025

(54) TRIPLE-MODE RESONATOR AND A WAVEGUIDE FILTER COMPRISING THE SAME

(71) Applicant: Telefonaktiebolaget LM Ericsson (publ), Stockholm (SE)

(72) Inventors: Honglan Wang, Beijing (CN); Haitao Liu, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 187 days.

(21) Appl. No.: 18/022,317

(22) PCT Filed: Sep. 16, 2020

(86) PCT No.: PCT/CN2020/115656
§ 371 (c)(1),
(2) Date: Feb. 21, 2023

(87) PCT Pub. No.: WO2022/056739
PCT Pub. Date: Mar. 24, 2022

(65) Prior Publication Data

US 2023/0335879 A1 Oct. 19, 2023

(51) Int. Cl.
*H01P 7/10* (2006.01)
*H01P 1/208* (2006.01)

(52) U.S. Cl.
CPC ............ *H01P 7/105* (2013.01); *H01P 1/2086* (2013.01)

(58) Field of Classification Search
CPC ............................... H01P 7/105; H01P 1/2086
(Continued)

(56) References Cited

U.S. PATENT DOCUMENTS

2013/0049899 A1 2/2013 Hendry et al.
2015/0180103 A1 6/2015 Hendry et al.
(Continued)

FOREIGN PATENT DOCUMENTS

CN 104995788 A 10/2015
CN 109273808 A 1/2019
(Continued)

OTHER PUBLICATIONS

Hunter, et al., "Integrated Ceramic Waveguide Filters With Improved Spurious Performance," Proceedings of the 45th European Microwave Conference, Sep. 7-10, 2015, Paris, France, pp. 674-677.
(Continued)

*Primary Examiner* — Jorge L Salazar, Jr.
(74) *Attorney, Agent, or Firm* — Withrow & Terranova, PLLC

(57) ABSTRACT

The present disclosure relates to a triple-mode resonator, comprising: a main body made of a dielectric material and having a cuboid shape defining three orthogonal axes (x, y, z) substantially aligned with faces of the main body; and a conductive coating covering all of the main body except portions of the faces of the main body which defines at least one coupling aperture through which a signal can be coupled into and/or out of the main body, wherein the coupling aperture has a closed shape comprising a first and a second main edges extending along two of the axes respectively and a third main edge extending neither parallel nor perpendicular to the first and second main edges, the general shape and size and location of the coupling aperture is mainly determined by the first, second and third main edges, and the coupling aperture is configured in such a manner that desired three dominant resonance modes can be excited independently in the resonator by an input signal introduced therethrough.

18 Claims, 6 Drawing Sheets

(58) Field of Classification Search
USPC .............................. 333/219.1, 212, 227, 230
See application file for complete search history.

(56) References Cited

U.S. PATENT DOCUMENTS

| | | | | |
|---|---|---|---|---|
| 2015/0380794 | A1 | 12/2015 | Cooper et al. | |
| 2015/0380799 | A1 | 12/2015 | Cooper et al. | |
| 2018/0219268 | A1 | 8/2018 | Cooper et al. | |
| 2021/0194108 | A1* | 6/2021 | Hendry | H01P 1/20 |

FOREIGN PATENT DOCUMENTS

| | | | |
|---|---|---|---|
| WO | 2020032939 | A1 | 2/2020 |
| WO | 2020048064 | A1 | 3/2020 |

OTHER PUBLICATIONS

International Search Report and Written Opinion for International Patent Application No. PCT/CN2020/115656, mailed May 26, 2021, 7 pages.
First Office Action for Chinese Patent Application No. 202080102499.0, mailed Oct. 15, 2024, 22 pages.
Extended European Search Report for European Patent Application No. 20953597.0, mailed Feb. 7, 2024, 12 pages.
Second Office Action for Chinese Patent Application No. 202080102499.0, mailed May 23, 2025, 20 pages.

* cited by examiner

TRIPLE-MODE RESONATOR AND A WAVEGUIDE FILTER COMPRISING THE SAME

This application is a 35 U.S.C. § 371 national phase filing of International Application No. PCT/CN2020/115656, filed Sep. 16, 2020, the disclosure of which is incorporated herein by reference in its entirety.

TECHNICAL FIELD

The present disclosure generally relates to the technical field of a filter and, more particularly, to a triple-mode resonator and a waveguide filter comprising the triple-mode resonator.

BACKGROUND

This section introduces aspects that may facilitate better understanding of the present disclosure. Accordingly, the statements of this section are to be read in this light and are not to be understood as admissions about what is in the prior art or what is not in the prior art.

With the development of 5G communication, the multiple-input and multiple-output (MIMO) technology is widely used in a Sub-6 GHz base station product, which requires a lot of filter units (FUs) to be integrated with an antenna unit (AU) or a radio unit (RU). For saving cost and space, FUs are usually soldered onto a radio mother board, a low pass filter (LPF) board, an antenna calibration (AC) board or a power splitter board, which means smaller and lighter FUs are quite in demand.

In traditional base stations, metal cavity FUs are widely used because of their high value of Q-factor and power handling performance, but there is still room for improvement in terms of size and weight of a FU for a 5G advanced radio system. A ceramic waveguide (CWG) filter, which is formed from ceramic block coated with conducting material, e.g. silver, is widely used also. Ceramic property of high permittivity reduces the guide wavelength, which makes a CWG filter have a smaller physical size than a conventional metal cavity filter for a specific resonant frequency.

A CWG filter, especially a multi-mode CWG filter, is highly recommended for a 5G FU, due to its high performance, light weight, small size and easy integration.

Currently, the value of Q-factor of a single mode CWG filter is lower than that of a metal cavity filter of the same size. For a single mode CWG filter, in order to increase its value of Q-factor, the size of the cavity have to be increased, which goes against the basic design needs for reduction in size.

Also, it is found that one multi-mode cavity can contribute a radio frequency (RF) feature that can be provided by several single-mode cavities, and the size of one multi-mode cavity is larger than one single-mode-cavity, but smaller than the summed size of the several single-mode cavities. That is, it is possible for a multi-mode filter that the Q-factor can be improved and at the mean time the total size can be reduced. As compared with a single-mode CWG filter, the value of Q-factor of a multi-mode CWG filter can be increased to be higher by 100%-120% with the volume being reduced by 30%-50%. Reduced volume of a multi-mode CWG filter allows integrating it with an AU, a RU or a macro station duplexer in a more convenient way. Hence, a multi-mode CWG filter is advantageous over a single-mode CWG filter in terms of achieving balance between high value of Q-factor and small size.

However, an existing multi-mode CWG has limited band width, which therefore cannot be applied to a wideband radio having high demands for wide band filters.

Another problem with existing multi-mode CWG filters is that most single-mode CWG filters make use of blind holes or grooves to realize a negative/capacitive coupling, but this coupling method for single-mode CWG filters is neither convenient for multi-mode coupling, nor handy in coupling value control. Furthermore, current multi-mode CWG filters suffer very bad harmonic performance due to their coupling method. Also, transmission zero settings cannot be achieved flexibly.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

One of the objects of the disclosure is to provide an improved solution for a waveguide filter with improved value of Q-factor, low insertion loss, high power capacity and improved harmonic performance.

According to a first aspect of the disclosure, there is provided a triple-mode resonator, comprising: a main body made of a dielectric material and having a cuboid shape defining three orthogonal axes substantially aligned with faces of the main body; and a conductive coating covering all of the main body except portions of the faces of the main body which defines at least one coupling aperture through which a signal can be coupled into and/or out of the main body. The coupling aperture has a closed shape comprising a first and a second main edges extending along two of the axes respectively and a third main edge extending neither parallel nor perpendicular to the first and second main edges. The general shape and size and location of the coupling aperture is mainly determined by the first, second and third main edges. The coupling aperture is configured in such a manner that desired three dominant resonance modes can be excited independently in the resonator by an input signal introduced therethrough.

In an embodiment of the disclosure, the coupling aperture is substantially triangle shaped.

In an embodiment of the disclosure, the third main edge is in the form of an arc segment.

In an embodiment of the disclosure, the arc segment curves towards an inside of the coupling aperture, wherein an arc center of the arc segment is the center of a face where the arc segment is located.

In an embodiment of the disclosure, the third main edge is line-shaped, inclining at an angle from 30° to 60°, preferably 45° with respect to the first or second main edge.

In an embodiment of the disclosure, the coupling aperture further comprises a fourth edge extending obliquely with respect to the first and second main edges so as to meet the first and second main edges.

In an embodiment of the disclosure, the fourth edge is located in a corner where extensions of the first and second main edges meet.

In an embodiment of the disclosure, the first and second main edges or their extensions meet in an area close to a right-angled corner in a face of the main body.

In an embodiment of the disclosure, an end of the first main edge connects to an end of the third main edge that is close to the first main edge, by a fifth edge perpendicular to the first main edge.

In an embodiment of the disclosure, an end of the second main edge connects to an end of the third main edge that is close to the second main edge, by a sixth edge perpendicular to the second main edge.

In an embodiment of the disclosure, one or more than one coupling aperture is provided in a face of the main body as input coupling aperture(s).

In an embodiment of the disclosure, one or more than one coupling aperture is provided in a face of the main body as output coupling aperture(s), and the face where the output coupling aperture(s) is located is substantially opposite to the face where the input coupling aperture(s) is located.

In an embodiment of the disclosure, the input coupling aperture(s) and the output coupling aperture(s) are or are not mirror symmetrical to each other.

In an embodiment of the disclosure, the dielectric material is ceramic.

According to a second aspect of the disclosure, there is provided a waveguide filter comprising a triple-mode resonator as stated in the above.

In an embodiment of the disclosure, the filter further comprises a first single-mode resonator having a main body of a dielectric material and an external conductive coating covering the main body with uncovered portions defining coupling apertures and a second single-mode resonator having a main body of a dielectric material and an external conductive coating covering the main body with uncovered portions defining coupling apertures, and the triple-mode resonator is sandwiched between the first and second single-mode resonators in such a manner that the triple-mode resonator communicates with the first and second single-mode resonators respectively via corresponding coupling apertures on their abutting faces and desired three dominant resonance modes can be excited in the triple-mode resonator.

In an embodiment of the disclosure, the filter further comprises a third single-mode resonator having a main body of a dielectric material and an external conductive coating covering the main body with uncovered portions defining coupling apertures, and the third single-mode resonator communicates with the first single-mode resonator via corresponding coupling apertures on their abutting faces.

In an embodiment of the disclosure, an output coupling aperture on the third single-mode resonator and an input coupling aperture on the first single-mode resonator are in the form of a circular slot.

In an embodiment of the disclosure, on a face of the third single-mode resonator opposite to the face where its output coupling aperture is located, an input means is connected to the dielectric material in the third single-mode resonator for supplying a signal to be filtered.

In an embodiment of the disclosure, a rotational axis of the input means is coincident with a central axis of circular slots of the third and first single-mode resonators.

In an embodiment of the disclosure, the third main edge of the coupling aperture on the triple-mode resonator is in the form of an arc segment curving towards an inside of the coupling aperture, wherein the arc center of the arc segment is the center of a face where the arc segment is located, and a rotational axis of the input means extends through the arc center of the arc segment.

In an embodiment of the disclosure, the filter further comprises a fourth single-mode resonator having a main body of a dielectric material and an external conductive coating covering the main body with uncovered portions defining coupling apertures, and the fourth single-mode resonator communicates with the second single-mode resonator via corresponding coupling apertures on their abutting faces.

In an embodiment of the disclosure, on a face of the fourth single-mode resonator opposite to the face where its input coupling aperture is located, an output means is connected to the dielectric material in the fourth single-mode resonator for outputting a filtered signal.

In an embodiment of the disclosure, the first single-mode resonator and the second single-mode resonator are mirror symmetrical to each other, and/or the third single-mode resonator and the fourth single-mode resonator are mirror symmetrical to each other.

In an embodiment of the disclosure, the first, second, third and fourth single-mode resonators and the triple-mode resonator have main bodies made of same dielectric material.

In an embodiment of the disclosure, the dielectric material for all the resonators is ceramic.

In an embodiment of the disclosure, the filter is formed into one piece by casting.

With the resonator of the present disclosure, the Q-factor of the triple-mode filter can be significantly improved as compared with the same sized cascaded single-mode filter. Consequently, the improved Q-factor results in an improved insertion loss for a waveguide filter. Also, the proposed coupling structures enables controlling the cross-coupling easily. Negative coupling and positive coupling can be more flexibly established, routed and placed. Desired wideband coupling can be achieved also.

By the waveguide filter of the present disclosure, near band attenuation performance can be realized in a better manner with less negative couplings, which benefits both near band spur and in-band insertion loss. Also, the harmonic parameter of the filter can be improved. Moreover, it allows simplifying the low-pass filter design, and thus improving the overall FU performance, especially insertion loss.

Additionally, the multi-mode CWG filter of the present disclosure can be flexibly designed so as to be installed within an AU or macro station. Due to the benefit in both production consistency and accuracy, production efficiency can be improved with production cost being reduced.

BRIEF DESCRIPTION OF THE DRAWINGS

These and other objects, features and advantages of the disclosure will become apparent from the following detailed description of illustrative embodiments thereof, which are to be read in connection with the accompanying drawings.

DETAILED DESCRIPTION

The embodiments of the present disclosure are described in detail with reference to the accompanying drawings. It should be understood that these embodiments are discussed only for the purpose of enabling those skilled in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. Those skilled in the relevant art will recognize that the disclosure may be practiced without one or more of the specific features or advantages of a particular embodiment. In other instances, additional features and advantages may be recognized in certain embodiments that may not be present in all embodiments of the disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Figure 1:
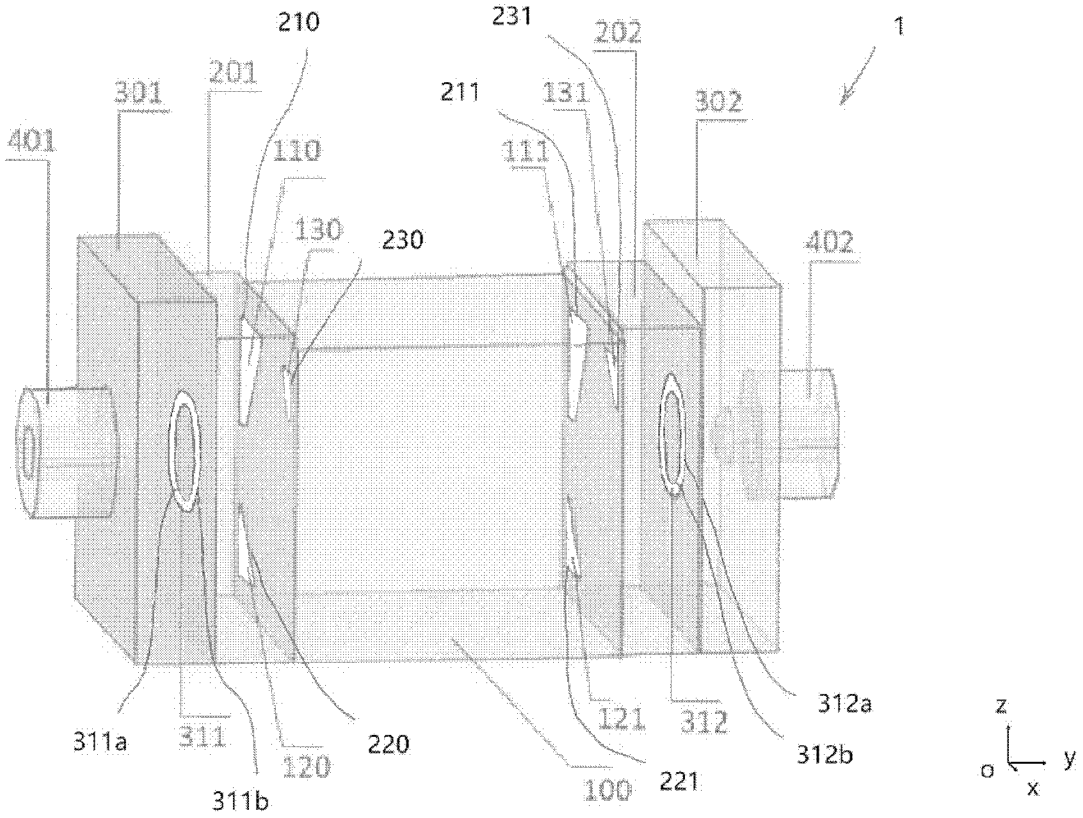
FIG. 1 is a perspective view of a waveguide filter according to the present disclosure.
Figure 2:
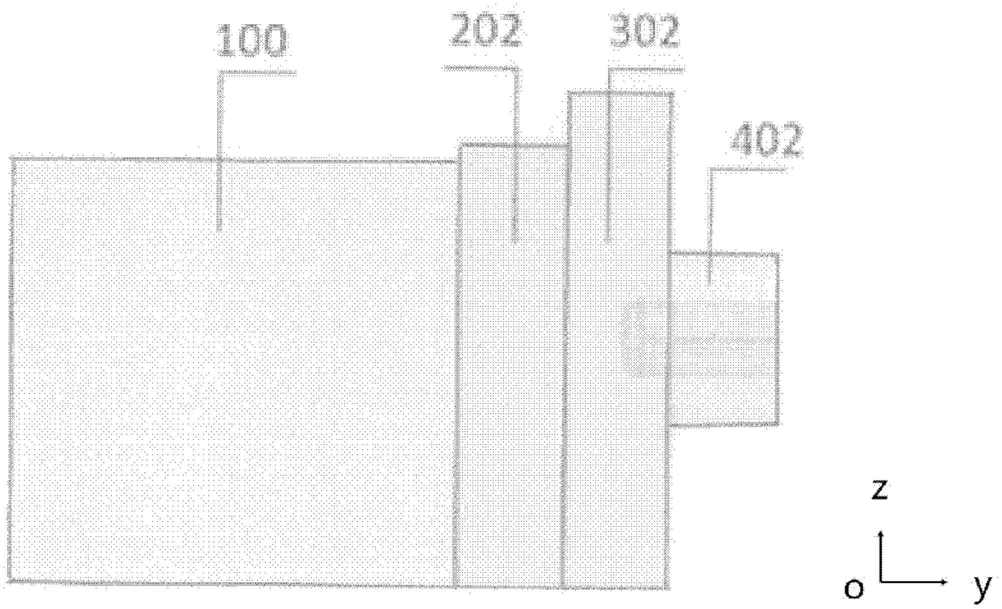
FIG. 2 is a perspective view of a portion of the waveguide filter as shown in FIG. 1.

FIG. 1 shows a perspective view of the waveguide filter 1 of the present disclosure, comprising multiple resonators coupled in series. FIG. 2 shows some resonators in a perspective view.

The waveguide filter 1 comprises a triple-mode resonator 100, and a first single-mode resonator 201 (i.e. a first intermediate resonator) and a second single-mode resonator 202 (i.e. second intermediate resonator) coupled to the triple-mode resonator on its opposite ends along the direction of y axis. A third single-mode resonator is coupled as an input resonator 301 to the first intermediate resonator 201. A fourth single-mode resonator is coupled as an output resonator 302 to the second intermediate resonator 202. In the embodiment shown in FIG. 1, the input and output resonators 301, 302 and the first and second intermediate resonators 201, 202 are single-mode resonators each comprising a main body and an external coating of conductive material covering the main body with uncovered portions for providing coupling apertures which allow coupling of signals to and from the main body. The input resonator 301 has an input means 401 connected to its main body to allow an unfiltered signal to be applied thereto, and the output resonator 302 has an output means 402 connected to its main body to allow a filtered signal to be output therefrom.

In the waveguide filter 1 shown in FIG. 1, the triple-mode resonator 100 is sandwiched between the first intermediate resonator 201 and the second intermediate resonator 202. Similar to those single-mode resonators 301, 201, 202, 302, the triple-mode resonator 100 comprises a main body and an external coating of conductive material covering the main body with uncovered portions for providing coupling apertures which allow coupling of signals to and from the main body.

Typically, for all the resonators 301, 201, 100, 202, 302, each of their main bodies incudes or is more typically manufactured from a solid body of a dielectric material having suitable dielectric properties. The dielectric materials for these resonators can be the same or different. In one example, their main bodies are ceramic blocks, although this is not essential and alternative materials can be used.

The main bodies of the input and output resonators 301, 302 and the first and second intermediate resonators 201, 202 can be in any shape. In the illustrated example, main bodies of the input and output resonators 301, 302 and the first and second intermediate resonators 201, 202 each are in the form of a rectangular cuboid defining three orthogonal axes substantially aligned with faces of the main body, as shown by the axes x, y, z in FIG. 1. In the illustrated example, the main body of the triple-mode resonator 100 is a ceramic block in the form of a cuboid (or a cube) having faces substantially aligned with the three orthogonal axes x, y, z.

The conductive materials for all these resonators can be the same or different. In the illustrated embodiment, silver is selected for all the resonators. It can be readily conceived by the skilled in the art, other conductive materials could be used such as gold, copper or the like.

Figure 3:
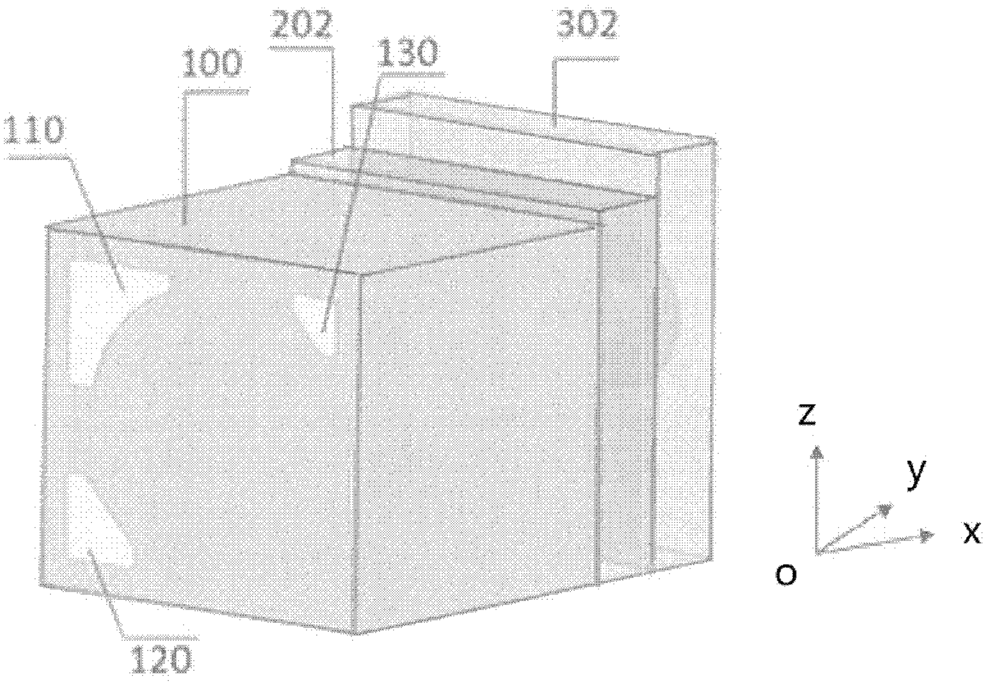
FIG. 3 is a side view of the portion of the waveguide filter as shown in FIG. 2.

Referring to FIGS. 1-3, all the resonators 301, 201, 100, 202, 302 are coupled in series by communication of corresponding coupling apertures on abutting faces thereon. In the example shown in FIG. 1, the input resonator 301 and the first intermediate resonator 201 abut against each other, with an output coupling aperture 311*a* in the external coating of the input resonator 301 being coaxially aligned with an input coupling aperture 311*b* in the external coating of the first intermediate resonator 201 so that an overlapping opening in the form of a circular slot is provided for passing electromagnetic energy from the input resonator 301 into the first intermediate resonator 201. Although it is shown that the coupling apertures 311*a* and 311*b* are in the form of a circular slot of the same size, it can be readily conceived that their shape and size can be designed differently as long as an opening 311 defined by their overlapping is circular and has sufficient cross-sectional area for energy transmission.

FIG. 3 shows particularly the coupling apertures 110, 120, 130 provided on an input face of the main body of the triple-mode resonator 100 as input coupling apertures. The coupling apertures 110, 120, 130 each have a closed shape comprising a first main edge 110*a*, 120*a*, 130*a* and a second main edge 110*c*, 120*c*, 130*c* extending along two of the axes z, x respectively and a third main edge 110*b*, 120*b*, 130*b* extending neither parallel nor perpendicular to the first and second main edges. The general shape and size and location of each input coupling aperture 110, 120, 130 is mainly determined by the first, second and third main edges. And the input coupling aperture(s) on the input face of the triple-mode resonator 100 is configured in such a manner that desired three dominant resonance modes can be excited independently in the triple-mode resonator 100 by an input signal introduced therethrough. Each main edge of the coupling aperture excites one resonance mode independent from other main edges of the coupling aperture. Thus, each mode can be adjusted separately.

The term "location" herein means the positional information of the input coupling apertures (including every section of its edges) in a certain plane right-angle coordinate system associated with the face where the input coupling apertures are located.

On an output face of the first intermediate resonator 201 that is opposite to the input face where the input coupling aperture 311*b* is located, three coupling apertures 210, 220, 230 are provided in the external coating of the first intermediate resonator 201 as output coupling apertures for communicating correspondingly with the coupling apertures 110, 120, 130 of the triple-mode resonators 100.

Although it is shown in FIG. 1 that each of the coupling apertures 210, 220, 230 is exactly the same in terms of shape, size and orientation as corresponding one of the coupling apertures 110, 120, 130, it can be readily conceivable by the skilled in the art that the coupling apertures aligned to each other on the abutting faces can be designed differently as long as the coupling apertures 110, 120, 130 of the triple-mode resonator 100 can function well to excite triple-mode resonance in its main body. For example, the shape, size, orientation may vary.

Figure 4:
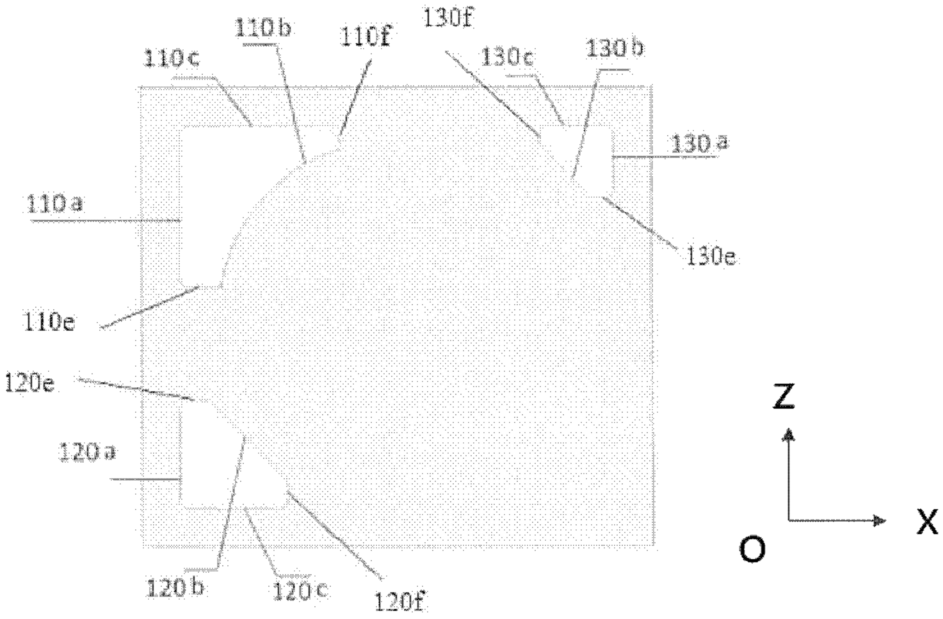
FIG. 4 is an end view of a triple-mode resonator of the present disclosure.
Figure 5:
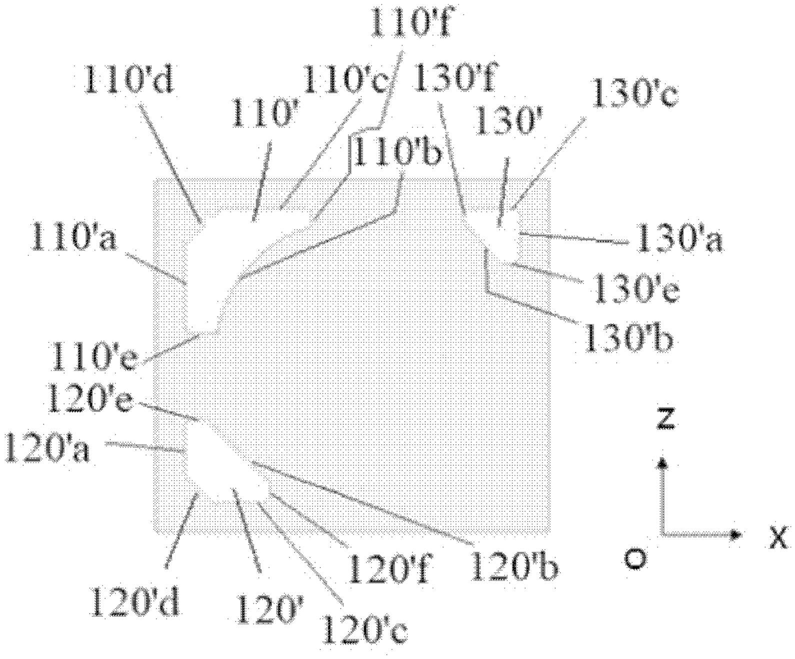
FIG. 5 is an end view of another variant of a triple-mode resonator of the present disclosure.

FIGS. 4 and 5 show some variants of the input coupling apertures 110, 120, 130, 110', 120', 130' of the triple-mode resonator 100 of the present disclosure. As can be seen from FIGS. 4 and 5, the input coupling aperture 110, 120, 130, 110', 120', 130' is substantially triangle shaped. The first main edge 110*a*, 120*a*, 130*a*, 130'*a* and the second main edge 110*c*, 120*c*, 130*c*, 130'*c* of a single input coupling aperture meet in an area close to a right-angled corner in the input face of the triple-mode resonator 100. The third main edge 110*b*, 110'*b* is in the form of an arc segment. The arc segment curves towards an inside of the coupling aperture 110, 110' with its arc center being the center of the input face of the triple-mode resonator 100 where the arc segment is located.

In the embodiment shown in FIG. 5, the input coupling apertures 110', 120' each comprise a fourth edge 110'*d*, 120'*d* extending obliquely with respect to the first main edge 110'*a*, 120'*a* and the second main edge 110'*c*, 120'*c* in such a manner that it meets the first main edge 110'*a*, 120'*a* and the second main edge 110' c, 120' c at its end respectively. The fourth edge 110'*d*, 120'*d* is located in a corner where the extensions of the first main edge 110'*a*, 120'*a* and the second main edge 110'*c*, 120'*c* meet. That is, the fourth edge 110'*d*, 120'*d* is embodied as a chamfer. In the illustrated example, the extensions of the first main edge 110'*a*, 120'*a* and the second main edge 110' c, 120'*c* of a single input coupling aperture meet in an area close to a right-angled corner in the input face of the triple-mode resonator 100 of the present disclosure.

Also, in the input coupling apertures 110, 120, 130, 110', 120', 130' shown in FIGS. 4 and 5, an end of the first main edge 110*a*, 120*a*, 130*a*, 110'*a*, 120'*a*, 130'*a* connects to an end of the third main edge 110*b*, 120*b*, 130*b*, 110'*b*, 120'*b*, 130'*b* that is close to the first main edge, by a fifth edge 110*e*, 120*e*, 130*e*, 110'*e*, 120'*e*, 130'*e* perpendicular to the first main edge. An end of the second main edge 110*c*, 120*c*, 130*c*, 110'*c*, 120'*c*, 130'*c* connects to an end of the third main edge 110*b*, 120*b*, 130*b*, 110'*b*, 120'*b*, 130'*b* that is close to the second main edge, by a six edge 110*f*, 120*f*, 130*f*, 110'*f*, 120'*f*, 130'*f* perpendicular to the second main edge.

As shown in FIGS. 4 and 5, all input coupling apertures 110, 120, 130, 110', 120', 130' of the triple-mode resonator 100 are not exactly triangle-shaped. But they can be considered as substantially triangle-shaped, and it can be readily conceivable by the skilled person in the art that these input coupling apertures of the triple-mode resonator can be configured in an exactly triangle shape or in other shapes that can be derived from a triangle or polygon shape or similar geometry, as long as desired three dominant resonance modes can be excited independently in the resonator by an input signal introduced through the input coupling aperture. Additionally, although it is shown that three coupling apertures are provided in the input face of the resonator, the number of the input coupling apertures can be varied according to practical needs. For example, only one input coupling aperture or more than one input coupling apertures are provided in the input face of the main body of the resonator. The arrangement of input coupling aperture(s) can be changed accordingly, as long as three dominant resonance modes can be excited independently as desired in the main body of the triple-mode resonator.

Figure 6:
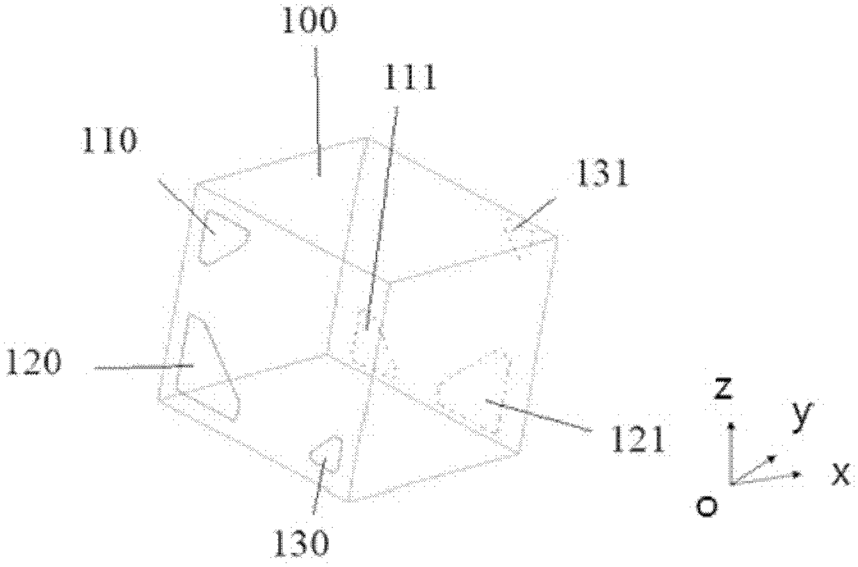
FIG. 6 is a perspective view of another variant of a triple-mode resonator of the present disclosure.

Referring back to FIG. 1, three coupling apertures 111, 121, 131 are provided as output coupling apertures in the face of the main body of the triple-mode resonator 100 which is substantially opposite to the face where the input coupling apertures 110, 120, 130 are located. In the illustrated example, the output coupling apertures 111, 121, 131 are configured and distributed in nearly the same way as the input coupling apertures 110, 120, 130, so that they can be considered as substantially mirror symmetrical to each other with respect to a symmetry plane of the triple-mode resonator 100 perpendicular to the direction of y axis. However, it is not compulsory that the output coupling apertures 111, 121, 131 be placed and/or shaped and/or sized and/or oriented to be exactly the same as the input coupling apertures 110, 120, 130. The skilled person in the art can envisage other configuration of the output coupling apertures of the triple-mode resonator 100 (for example, the configuration/arrangement of the output coupling apertures shown in FIG. 6) as long as they can output signals filtered with the triple-mode resonance inside the resonator 100.

Similar to the first intermediate resonator 201, the second intermediate resonator 202 comprises three input coupling apertures 211, 221, 231 provided in its face abutting the output face of the triple-mode resonator 100 and an output coupling aperture 312*b* in the form of a circular slot. Via the input coupling apertures 211, 221, 231, the signal output by the triple-mode resonator 100 is introduced into the second intermediate resonator 202, and finally exits via its output coupling aperture 312*b*. For communicating with the output coupling aperture 312*b*, an input coupling aperture 312*a* is provided in the output resonator 302. Although it is shown that the coupling apertures 312*a* and 312*b* each are in the form of a circular slot of the same size, it can be readily conceived that their shape and size can be designed differently as long as an opening 312 defined by the overlapping of the output coupling aperture 312*b* and the input coupling aperture 312*a* is circular and has sufficient cross-sectional area for energy transmission.

In the illustrated example, a rotation axis of the input means 401 is coincident with a central axis of the circular opening 311. Preferably, the rotation axis of the input means 401 extend through the arc center of the third main edge 110*b*, 110'*b* in the form of the arc segment. In a preferable embodiment as shown in FIG. 1, the first intermediate resonator 201 and the second intermediate resonator 202 are configured and aligned in such a manner that they are mirror symmetrical to each other with respect to the symmetry plane of the triple-mode resonator 100 perpendicular to the direction of y axis, and/or the input resonator 301 and the output resonator 302 are configured and aligned in such a manner that they are mirror symmetrical to each other with respect to the symmetry plane of the triple-mode resonator 100 perpendicular to the direction of y axis. As shown in FIG. 1, the input means 401 and the output means 402 are substantially coaxially provided.

Figure 7A:
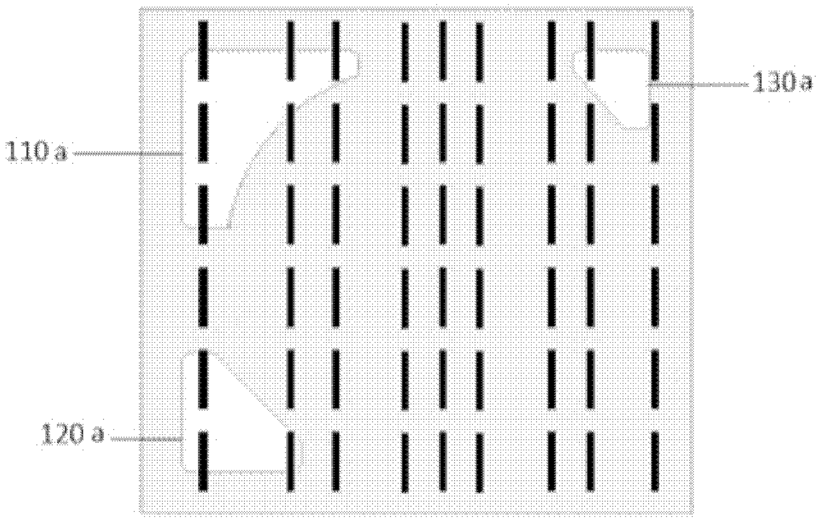
FIG. 7A shows an E-field in mode-1 excited by coupling apertures of the triple-mode resonator of the present disclosure as shown in FIG. 4.
Figure 7B:
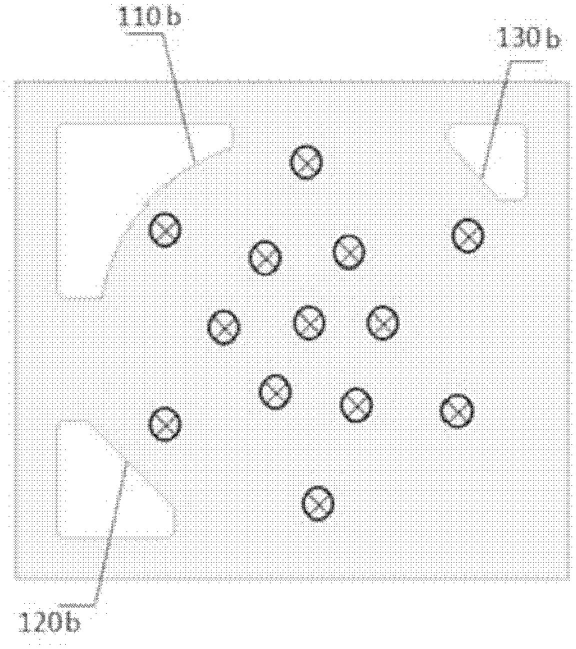
FIG. 7B shows an E-field in mode-2 exited by coupling apertures of the triple-mode resonator of the present disclosure as shown in FIG. 4.

For better understanding of the present disclosure, the working principle and technical advantages of the waveguide filter 1 will be expounded as follows:

An E-field excited by the input means 402 inside the input resonator 301, which is in mode-2, is along the direction of y axis and perpendicular to the x-o-z plane, as shown in FIG. 7B. The first intermediate resonator 201 plays as a mode transforming section via the communications associated with its input coupling aperture 311*b* and output coupling apertures 210, 220, 230. Via the input coupling apertures 110, 120, 130, three dominant resonance modes, i.e. mode-1 (as shown in FIG. 7A), mode-2 (as shown in FIG. 7B) and mode-3 (as shown in FIG. 7C) can be exited in the triple-mode resonator 100.

Particularly, the first main edge 110*a*, 120*a*, 130*a* is mainly responsible for coupling from mode-2 in the input resonator 301 (the first intermediate resonator) to mode-1 in the triple-mode resonator 100, as shown in FIG. 7A. The length and the position of the first main edge 110*a*, 120*a*, 130*a* define the coupling strength from mode-2 in the input resonator 301 (and/or the first intermediate resonator) to mode-1 in the triple-mode resonator 100. Further, the position of the first main edge 110*a*, 120*a*, 130*a* defines the sign of the coupling. That is, the sign of the coupling can be tuned to be either positive or negative by changing the position of the first main edge 110*a*, 120*a*, 130*a*. Also, the first main edge 110*a*, 120*a*, 130*a* can be precisely designed to tune the cross-coupling between mode-1 inside the triple-mode resonator 100.

Figure 7C:
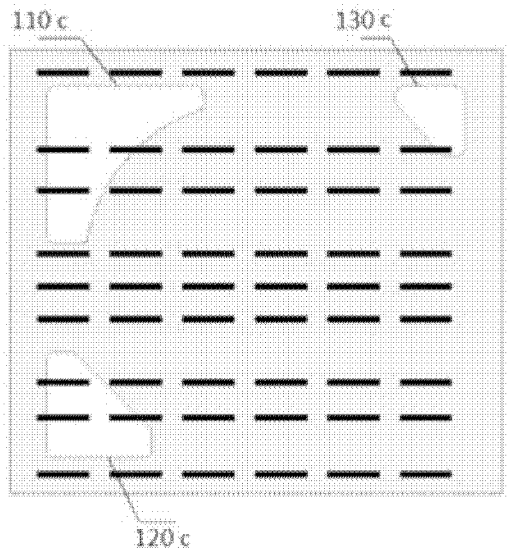
FIG. 7C shows an E-field in mode-3 exited by coupling apertures of the triple-mode resonator of the present disclosure as shown in FIG. 4.

The second main edge 110*c*, 120*c*, 130*c* is mainly responsible for coupling from mode-2 in the input resonator 301 (and/or the first intermediate resonator) to mode-3 in the triple-mode resonator 100, as shown in FIG. 7C. The coupling strength can be adjusted by changing the length and position of the second main edge 110*c*, 120*c*, 130*c*. Furthermore, the position of the second main edge 110*c*, 120*c*, 130*c* defines the sign of the coupling. The sign of the coupling can be tuned to be either positive and negative by changing the position of the second main edge. Also, the second main edge 110*c*, 120*c*, 130*c* can be precisely designed to tune the cross-coupling between mode-3 inside the triple-mode resonator 100.

The third main edge 110*b*, 120*b*, 130*b* is mainly responsible for coupling from mode-2 in the input resonator 301 (and/or the first intermediate resonator) to mode-2 in the triple-mode resonator 100, as shown in FIG. 7B. The third main edge 110*b*, 120*b*, 130*b* can be precisely designed to tune the cross-coupling between mode-2 inside the triple-mode resonator 100. The coupling efficiency can be adjusted to reach its maximum value by arranging the input means 401 in such a manner that its rotation axis is coincident with a central axis of the circular opening 311, and extends through the arc center of the third main edge 110*b*, 110'*b* in the form of the arc segment, as shown in FIG. 1. For reducing the coupling efficiency, the third main edge of the input coupling aperture of the triple-mode resonator 100 can be altered to a line, as shown by lines 120*b*, 130*b*, 120'*b*, 130'*b* in FIGS. 4 and 5. In a preferable embodiment, the line-shaped third main edge inclines at an angle of 45° or an angle of about 45° (e.g. from 30° to 60°, or from 20° to 70°) with respect to the x or z axis. Also, the coupling strength can be varied by changing the position and shape of the third main edge 110*b*, 120*b*, 130*b*, 110'*b*, 120'*b*, 130'*b*.

Figure 8:
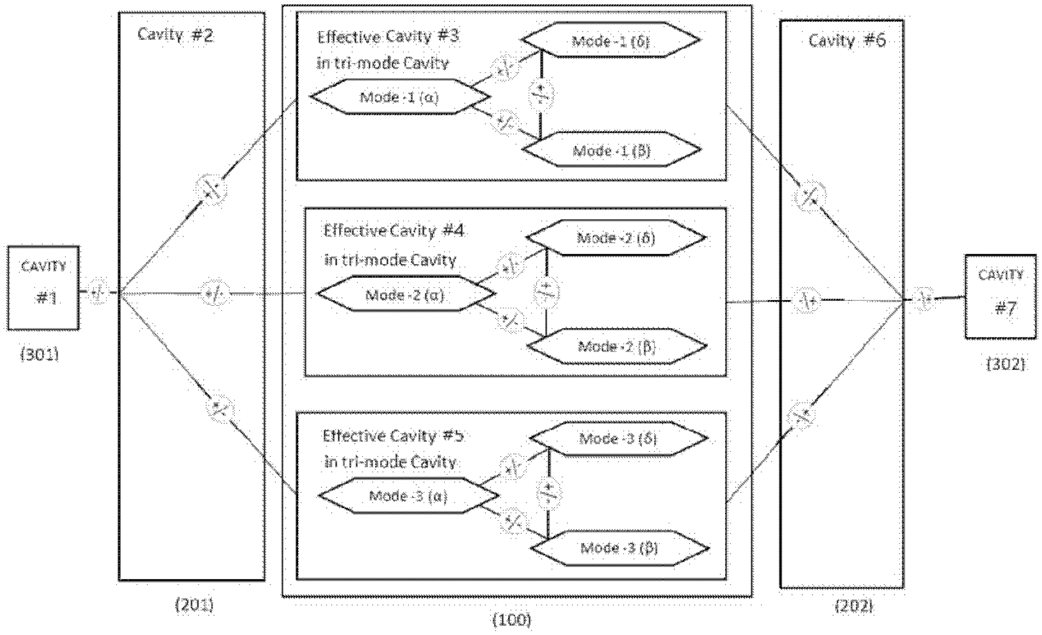
FIG. 8 shows a topology of a waveguide filter of the present disclosure.

FIG. 8 shows the corresponding topology of the waveguide filter 1 as shown in FIG. 1. For better illustration, the triple-mode resonator 100 can be considered as comprising three effective cavities #3, #4, #5 for resonances in mode-1, mode-2 and mode-3 respectively. And the single-mode resonators 301, 201, 202, 302 can be considered as comprising cavities #1, #2, #6, #7 for the single-mode resonance therein respectively. A seven-pole topology with 2 pairs of symmetric zeroes is provided, wherein eight mainline couplings (i.e. couplings between cavities #1 and #2, between cavities #2 and #3, between cavities #3 and #6, between cavities #2 and #4, between cavities #4 and #6, between cavities #2 and #5, between cavities #5 and #6, between cavities #6 and #7) are provided from corresponding coupling apertures on the abutting faces of the resonators. With this topology, the main-coupling and cross-coupling can be freely manipulated to fulfill the transmission function as demanded. Capacitive/negative cross-coupling between cavities #2 and #5 with small coupling value is provided. As shown in the topology of FIG. 8, cross-couplings between mode-1 and mode-2 in the triple-mode resonator 100, between mode-1 and mode-3 in the triple-mode resonator 100, and between mode-2 and mode-3 in the triple-mode resonator 100 have to be bridged by the first intermediate resonator 201 and the second intermediate resonator 202 respectively.

In view of the above, within the waveguide filter of the present disclosure, productive strong main/negative/capacitive coupling can be provided, which can realize coupling value and shape flexibly.

In case that same dielectric material, for example, ceramic, is chosen for the main bodies of all the resonators in the waveguide filter 1, the waveguide filter 1 can be formed into one piece by casting. In this way, the assembling steps required for connecting all the resonators in series can be dispensed with and the production efficiency can thus be improved.

Although it is shown in FIG. 1 that five resonators are coupled to form a filter, the number of resonators/filter poles can be changed so as to influence the near band attenuation/selectivity of the filter as expected. Under the same order of filter, the number of zeroes or the number of cross couplings can make great help to optimize the near band attenuation performance of filter.

References in the present disclosure to “an embodiment”, “another embodiment” and so on, indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

It should be understood that, the term “and/or” includes any and all combinations of one or more of the associated listed terms.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components, but do not preclude the presence or addition of one or more other features, elements, components and/or combinations thereof. The terms "connect", "connects", "connecting" and/or "connected" used herein cover the direct and/or indirect connection between two elements.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-limiting and exemplary embodiments of this disclosure.

What is claimed is:

1. A triple-mode resonator, comprising:

a main body made of a dielectric material and having a cuboid shape defining three orthogonal axes (x, y, z) substantially aligned with faces of the main body; and a conductive coating covering all of the main body except portions of the faces of the main body which defines at least one coupling aperture through which a signal can be coupled into and/or out of the main body, wherein the at least one coupling aperture has a closed shape comprising a first and a second main edges extending along two of the axes respectively and a third main edge extending neither parallel nor perpendicular to the first and second main edges, a general shape and size and location of the at least one coupling aperture is mainly determined by the first, second and third main edges, and the at least one coupling aperture is configured in such a manner that desired three dominant resonance modes can be excited independently in the resonator by an input signal introduced therethrough, and wherein the third main edge is in the form of an arc segment.

2. The triple-mode resonator according to claim 1, wherein the at least one coupling aperture is substantially triangle shaped.

3. The triple-mode resonator according to claim 1, wherein the arc segment curves towards an inside of the at least one coupling aperture, wherein an arc center of the arc segment is a center of a face where the arc segment is located.

4. The triple-mode resonator according to claim 1, wherein the at least one coupling aperture further comprises a fourth edge extending obliquely with respect to the first and second main edges so as to meet the first and second main edges.

5. The triple-mode resonator according to claim 4, wherein the fourth edge is located in a corner where extensions of the first and second main edges meet.

6. The triple-mode resonator according to claim 1, wherein the first and second main edges or extensions of the first and second main edges meet in an area close to a right-angled corner in a face of the main body.

7. The triple-mode resonator according to claim 1, wherein an end of the first main edge connects to an end of the third main edge that is close to the first main edge, by a fifth edge perpendicular to the first main edge.

8. The triple-mode resonator according to claim 1, wherein an end of the second main edge connects to an end of the third main edge that is close to the second main edge, by a sixth edge perpendicular to the second main edge.

9. The triple-mode resonator according to claim 1, wherein one coupling aperture of the at least one coupling aperture is provided in a face of the main body as input coupling aperture(s).

10. The triple-mode resonator according to claim 9, wherein another one coupling aperture of the at least one coupling aperture is provided in a face of the main body as output coupling aperture(s), and the face where the output coupling aperture(s) is located is substantially opposite to the face where the input coupling aperture(s) is located.

11. The triple-mode resonator according to claim 10, wherein the input coupling aperture(s) and the output coupling aperture(s) are or are not mirror symmetrical to each other.

12. A waveguide filter, comprising a triple-mode resonator that comprises:

a main body made of a dielectric material and having a cuboid shape defining three orthogonal axes (x, y, z) substantially aligned with faces of the main body; and a conductive coating covering all of the main body except portions of the faces of the main body which defines at least one coupling aperture through which a signal can be coupled into and/or out of the main body, wherein the at least one coupling aperture has a closed shape comprising a first and a second main edges extending along two of the axes respectively and a third main edge extending neither parallel nor perpendicular to the first and second main edges, a general shape and size and location of the at least one coupling aperture is mainly determined by the first, second and third main edges, and the at least one coupling aperture is configured in such a manner that desired three dominant resonance modes can be excited independently in the resonator by an input signal introduced therethrough, and wherein the third main edge is in the form of an arc segment.

13. The waveguide filter according to claim 12, wherein the filter further comprises a first single-mode resonator having a main body of a dielectric material and an external conductive coating covering the main body with uncovered portions defining coupling apertures and a second single-mode resonator having a main body of a dielectric material and an external conductive coating covering the main body with uncovered portions defining coupling apertures, and the triple-mode resonator is sandwiched between the first and second single-mode resonators in such a manner that the triple-mode resonator communicates with the first and second single-mode resonators respectively via corresponding coupling apertures on their abutting faces and the desired three dominant resonance modes can be excited in the triple-mode resonator.

14. The waveguide filter according to claim 13, wherein the filter further comprises a third single-mode resonator having a main body of a dielectric material and an external conductive coating covering the main body with uncovered portions defining coupling apertures, and the third single-mode resonator communicates with the first single-mode resonator via corresponding coupling apertures on their abutting faces.

15. The waveguide filter according to claim 14, wherein an output coupling aperture on the third single-mode resonator and an input coupling aperture on the first single-mode resonator are in the form of a circular slot.

16. The waveguide filter according to claim 15, wherein on a face of the third single-mode resonator opposite to the face where its output coupling aperture is located, an input means is connected to the dielectric material in the third single-mode resonator for supplying a signal to be filtered.

17. The waveguide filter according to claim 16, wherein a rotational axis of the input means is coincident with a central axis of circular slots of the third and first single-mode resonators.

18. The waveguide filter according to claim 16, wherein the third main edge of the at least one coupling aperture on the triple-mode resonator is in the form of the arc segment curving towards an inside of the at least one coupling aperture, wherein the arc center of the arc segment is the center of a face where the arc segment is located, and a rotational axis of the input means extends through the arc center of the arc segment.

* * * * *